United States Patent
Motomura

(10) Patent No.: US 10,029,373 B2
(45) Date of Patent: Jul. 24, 2018

(54) ALARM CONTROL DEVICE AND NOTIFICATION CONTROL METHOD

(71) Applicant: Sharp Kabushiki Kaisha, Sakai, Osaka (JP)

(72) Inventor: Akira Motomura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 5 days.

(21) Appl. No.: 15/319,962

(22) PCT Filed: Nov. 17, 2015

(86) PCT No.: PCT/JP2015/082267
§ 371 (c)(1),
(2) Date: Dec. 19, 2016

(87) PCT Pub. No.: WO2016/052764
PCT Pub. Date: Apr. 7, 2016

(65) Prior Publication Data
US 2017/0210013 A1    Jul. 27, 2017

(30) Foreign Application Priority Data

Oct. 1, 2014  (JP) ................................ 2014-203421

(51) Int. Cl.
| | | |
|---|---|---|
| G06F 19/00 | (2018.01) | |
| B25J 13/00 | (2006.01) | |
| H04M 3/02 | (2006.01) | |
| H04L 12/58 | (2006.01) | |

(52) U.S. Cl.
CPC .............. B25J 13/00 (2013.01); *H04L 51/24* (2013.01); *H04M 3/02* (2013.01)

(58) Field of Classification Search
CPC .. G01N 23/046; G01N 3/08; G01N 2223/304; G01N 2223/607; G01B 15/06
See application file for complete search history.

(56) References Cited

U.S. PATENT DOCUMENTS

| | | | | |
|---|---|---|---|---|
| 2017/0136628 | A1* | 5/2017 | Inoue | ....................... B25J 13/02 |
| 2017/0210013 | A1* | 7/2017 | Motomura | ............... B25J 13/00 |

FOREIGN PATENT DOCUMENTS

| | | | |
|---|---|---|---|
| JP | 2002-368858 A | 12/2002 | |
| JP | 2006-041746 A | 2/2006 | |
| JP | 2007-214908 A | 8/2007 | |
| JP | 2013-151045 A | 8/2013 | |

* cited by examiner

*Primary Examiner* — Ian Jen
(74) *Attorney, Agent, or Firm* — Keating & Bennett, LLP

(57) ABSTRACT

To reliably allow the user to recognize occurrence of a notification event, a notification control device (1) includes a notification posture selecting section (14) configured to select a notification posture suited for allowing the user to recognize occurrence of a notification event, a transition information generating section (15) configured to generate transition information, the transition information being information on a posture transition process, through which the posture of the robot (100) transitions to the notification posture, and a notification method selecting section (16) configured to select a notification method, which is a method for the notification of the notification event.

5 Claims, 11 Drawing Sheets

FIG. 3

| NOTIFICATION EVENT | | ROTATION POSITION OF SERVOMOTOR | | | | NOTIFICATION POSTURE |
|---|---|---|---|---|---|---|
| | | FIRST SERVOMOTOR (ROTATION POSITION $\alpha$) | SECOND SERVOMOTOR (ROTATION POSITION $\beta$) | ... | N-TH SERVOMOTOR (ROTATION POSITION $\delta$) | |
| INCOMING TELEPHONE CALL | No1 | a1 | b1 | ... | n1 | 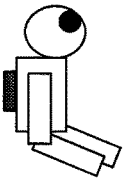 (A1) |
| | No2 | $a11 < \alpha < a12$ | $b11 < \beta < b12$ | ... | $n11 < \delta < n12$ | |
| ALARM | No3 | a2 | b2 | ... | n2 | 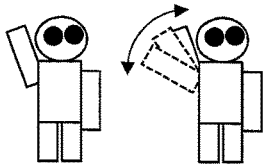 (A2) (A3) |
| | No4 | $a21 < \alpha < a22$ | $b21 < \beta < b22$ | ... | $n21 < \delta < n22$ | |
| TURNING ON OF TV | No5 | a3 | b3 | ... | n3 | 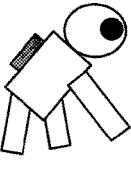 (A4) |
| | No6 | $a31 < \alpha < a32$ | $b31 < \beta < b32$ | ... | $n31 < \delta < n32$ | |
| LOW BATTERY | No7 | a4 | b4 | ... | n4 |  (A5) |
| | No8 | $a41 < \alpha < a42$ | $b41 < \beta < b42$ | ... | $n41 < \delta < n42$ | |

FIG. 4

| No. | SELECTED NOTIFICATION EVENT | SELECTED NOTIFICATION EVENT OCCURRENCE CONDITION |
|---|---|---|
| 1 | FIRST ALARM (WAKEUP ALARM) | 7:00 EVERY DAY |
| 2 | SECOND ALARM (SCHEDULE ALARM) | JANUARY 1, 2014, 10:00 |
| 3 | TURNING ON OF TV | EVERY MONDAY, 20:00, CHANNEL 1 |
| 4 | LOW BATTERY | REMAINING AMOUNT OF BATTERY POWER DROPS BELOW THRESHOLD |

FIG. 10
| NOTIFICATION EVENT | | ROTATION POSITION OF SERVOMOTOR | | | | NOTIFICATION POSTURE |
|---|---|---|---|---|---|---|
| | | FIRST SERVOMOTOR (ROTATION POSITION $\alpha$) | SECOND SERVOMOTOR (ROTATION POSITION $\beta$) | ... | THIRD SERVOMOTOR (ROTATION POSITION $\delta$) | |
| ALARM | PATTERN 1 | a2 | b2 | ... | n2 | (A2) 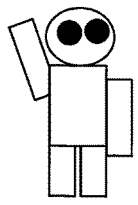 |
| | | $a21 < \alpha < a22$ | $b21 < \beta < b22$ | ... | $n21 < \delta < n22$ | |
| | PATTERN 2 | a2' | b2' | ... | n2' | (A2') 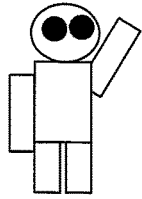 |
| | | $a21' < \alpha < a22'$ | $b21' < \beta < b22'$ | ... | $n21' < \delta < n22'$ | |

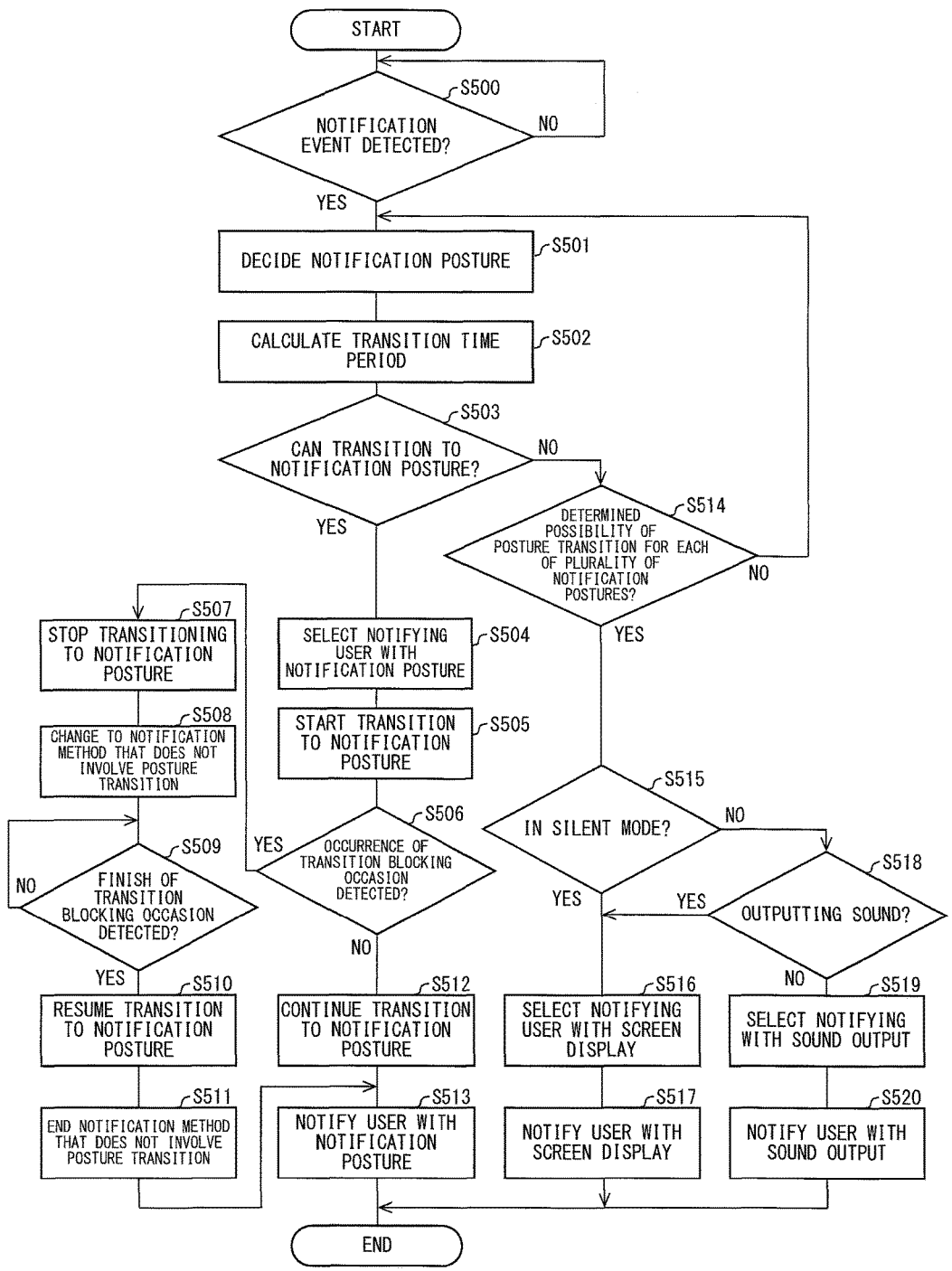

ALARM CONTROL DEVICE AND NOTIFICATION CONTROL METHOD

TECHNICAL FIELD

The present invention relates to a notification control device and a program each for controlling notification of occurrence of a notification event.

BACKGROUND ART

There have been known conventional techniques for providing notification of an incoming telephone call, an incoming email, or the like received by a mobile device, by changing an exterior form of a mobile device body or a mobile device accessory. For example, Patent Literature 1 discloses an event notification mechanism in which a driving pattern generating section (i) generates a driving pattern signal in real time and (ii) sends the driving pattern signal to an actuator, so that an accessory of a communications terminal or the communications terminal as such changes in form. This notifies a user of an event that has occurred (e.g., an incoming telephone call, incoming email, or reception of a digital TV broadcast, etc.).

CITATION LIST

Patent Literature

[Patent Literature 1]
Japanese Patent Application Publication, Tokukai, No. 2007-214908 A (Publication Date: Aug. 23, 2007)

SUMMARY OF INVENTION

Technical Problem

The event notification mechanism disclosed in Patent Literature 1 unfortunately does not allow a method for notification of an event that has occurred to be selected in view of, for example, a time period necessary for the change of the exterior form of a mobile device body or a mobile device accessory to end. The event notification mechanism therefore does not always allow the user to recognize occurrence of an event as a result of, for example, the event ending before the change of the exterior form ends.

Solution to Problem

In order to attain the above object, a notification control device in accordance with an aspect of the present invention is a notification control device, including: a notification posture selecting section configured to select a notification posture suited for allowing a user to recognize occurrence of a notification event, the notification event being an occasion of which a robot is configured to notify the user and for which the user needs to take an action in response to the notification by the robot; a transition information generating section configured to generate transition information on a basis of the notification posture, the transition information being information on a posture transition process, through which a posture of the robot at a time of the notification posture selecting section selecting the notification posture transitions to the notification posture; and a notification method selecting section configured to select a notification method on a basis of the transition information, the notification method being a method for the notification of the notification event.

Advantageous Effects of Invention

An aspect of the present invention reliably allows the user to recognize occurrence of a notification event.

Figure 2:
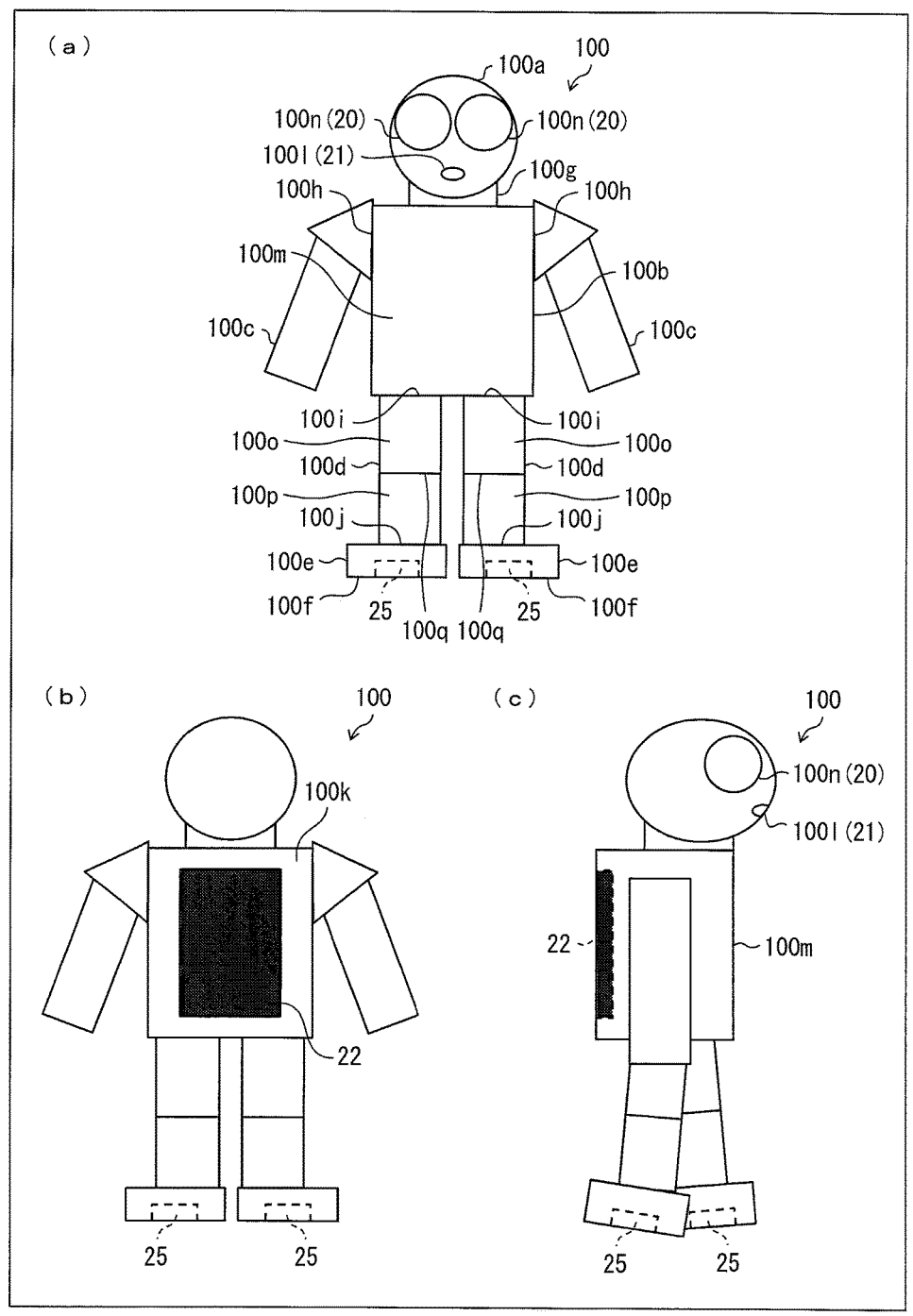

(a) of FIG. 2 is a schematic elevational view of the robot, (b) of FIG. 2 is a schematic rear view of the robot, and (c) of FIG. 2 is a schematic side view of the robot.

FIG. 3 is an example notification posture table stored in a storage section of the robot.

FIG. 4 is an example notification event occurrence table stored in a storage section of the robot.

Figure 5:
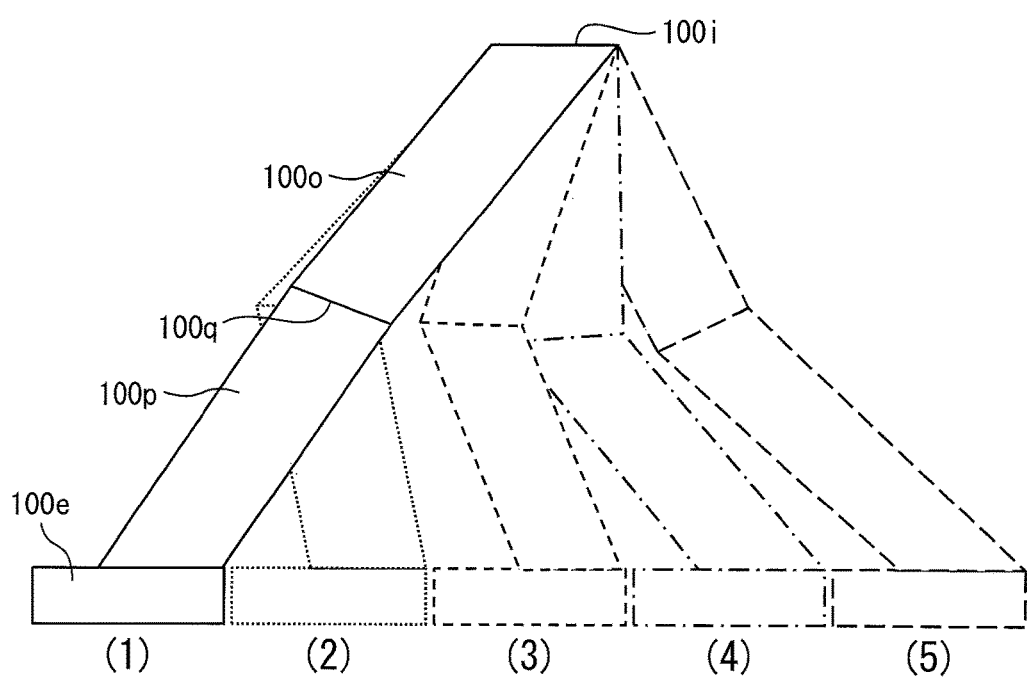

FIG. 5 is a diagram schematically illustrating an example operation of the robot which operation is simulated by a notification control device in accordance with Embodiment 1 of the present invention.

Figure 6:
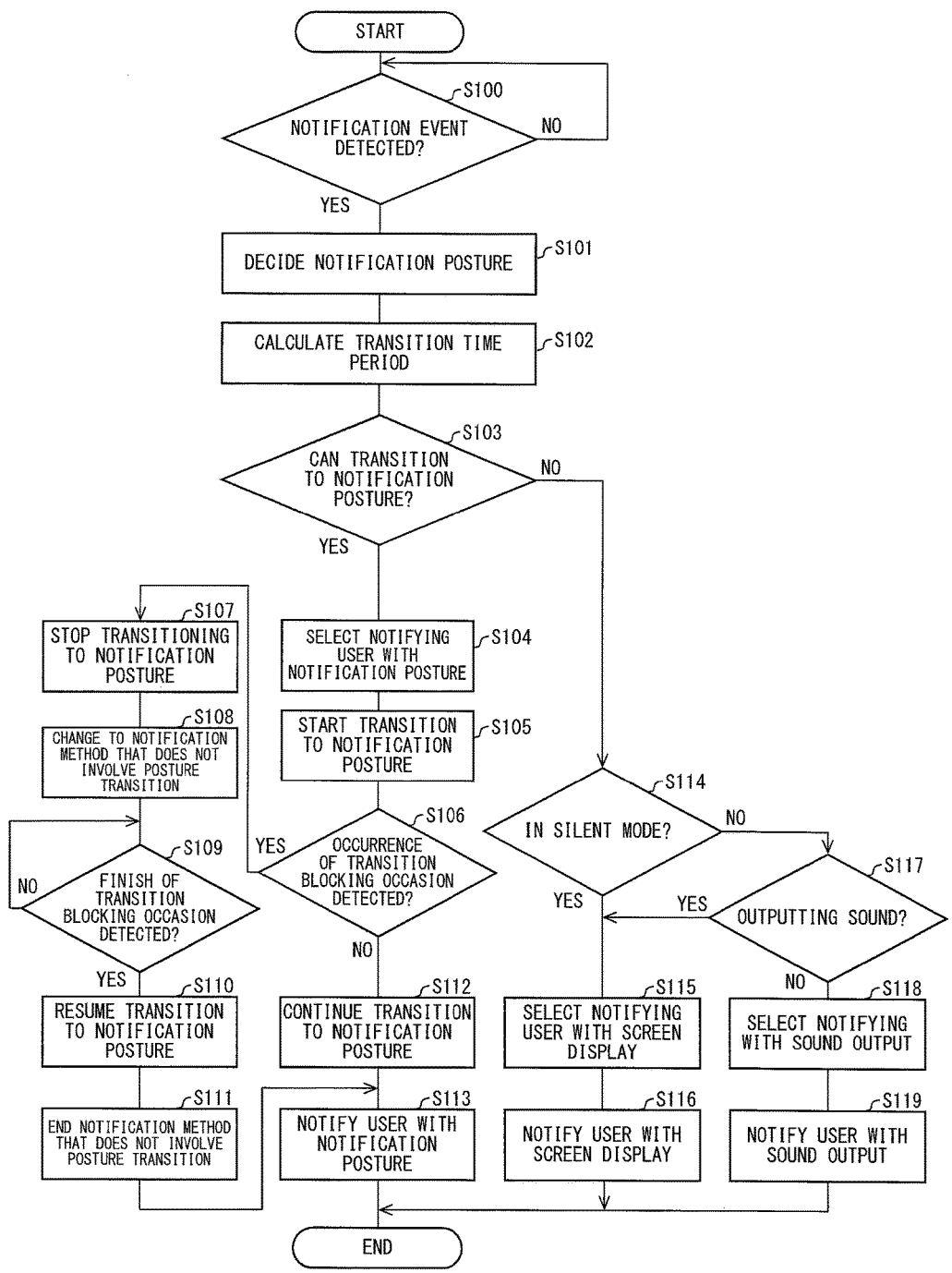

FIG. 6 is a flowchart illustrating how the notification control device in accordance with Embodiment 1 of the present invention controls notification of occurrence of a notification event (in a case where the notification event has been brought about by an external factor).

Figure 7:
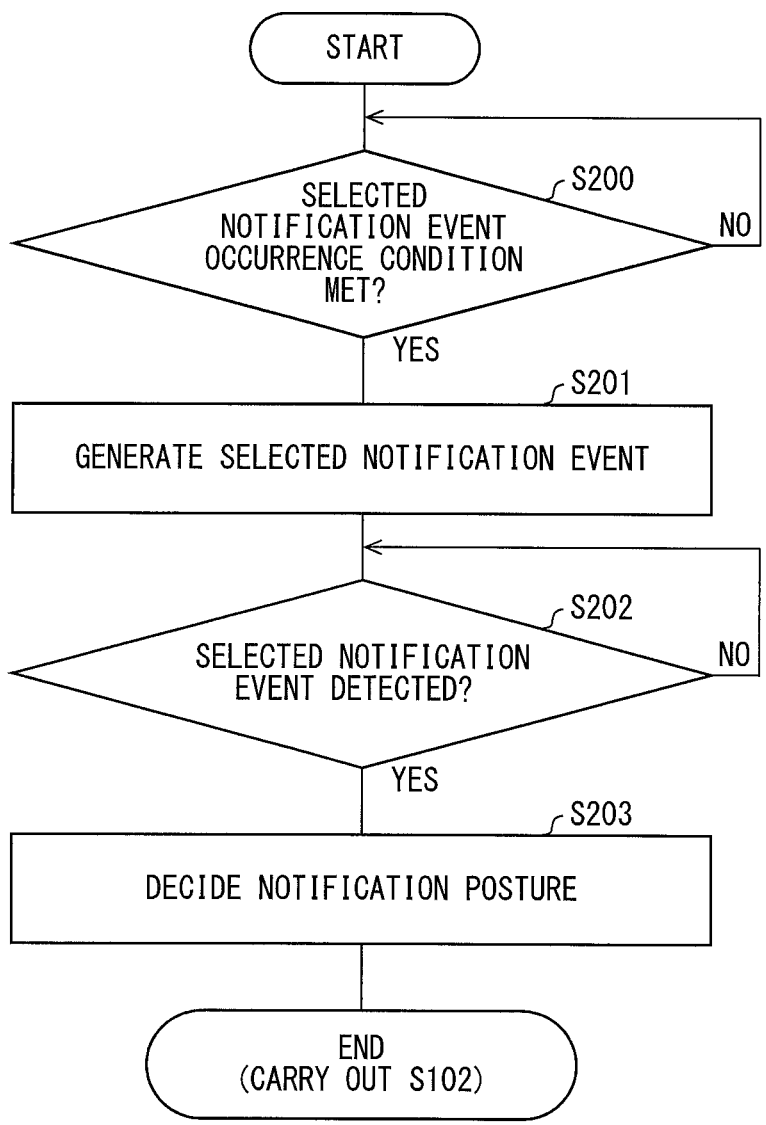

FIG. 7 is a flowchart illustrating how the notification control device in accordance with Embodiment 1 of the present invention controls notification of occurrence of a notification event (in a case of a selected notification event).

Figure 8:
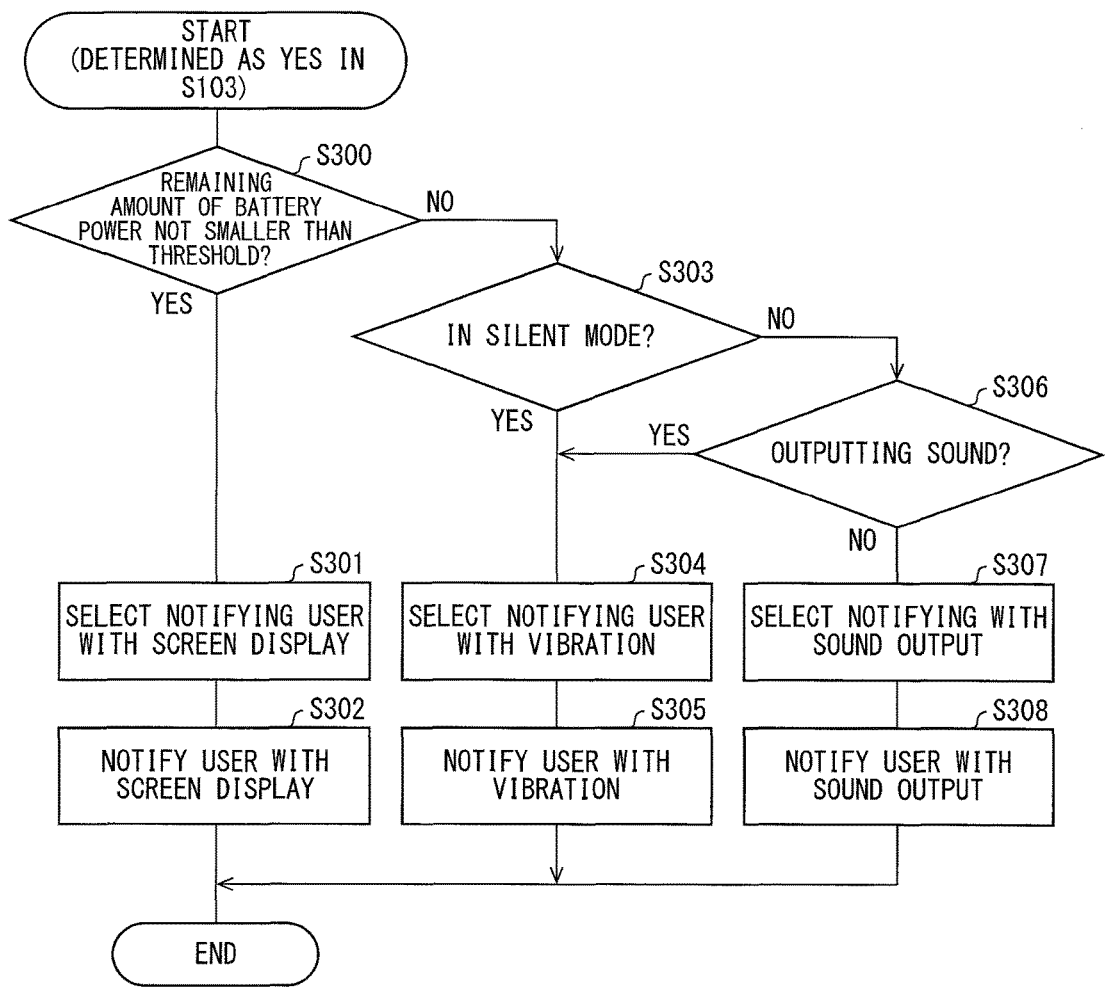

FIG. 8 is a flowchart illustrating how the notification control device in accordance with Embodiment 1 of the present invention controls notification of occurrence of a notification event (in a case where a notification method that does not use a notification posture is screen display, vibration, or sound output).

Figure 9:
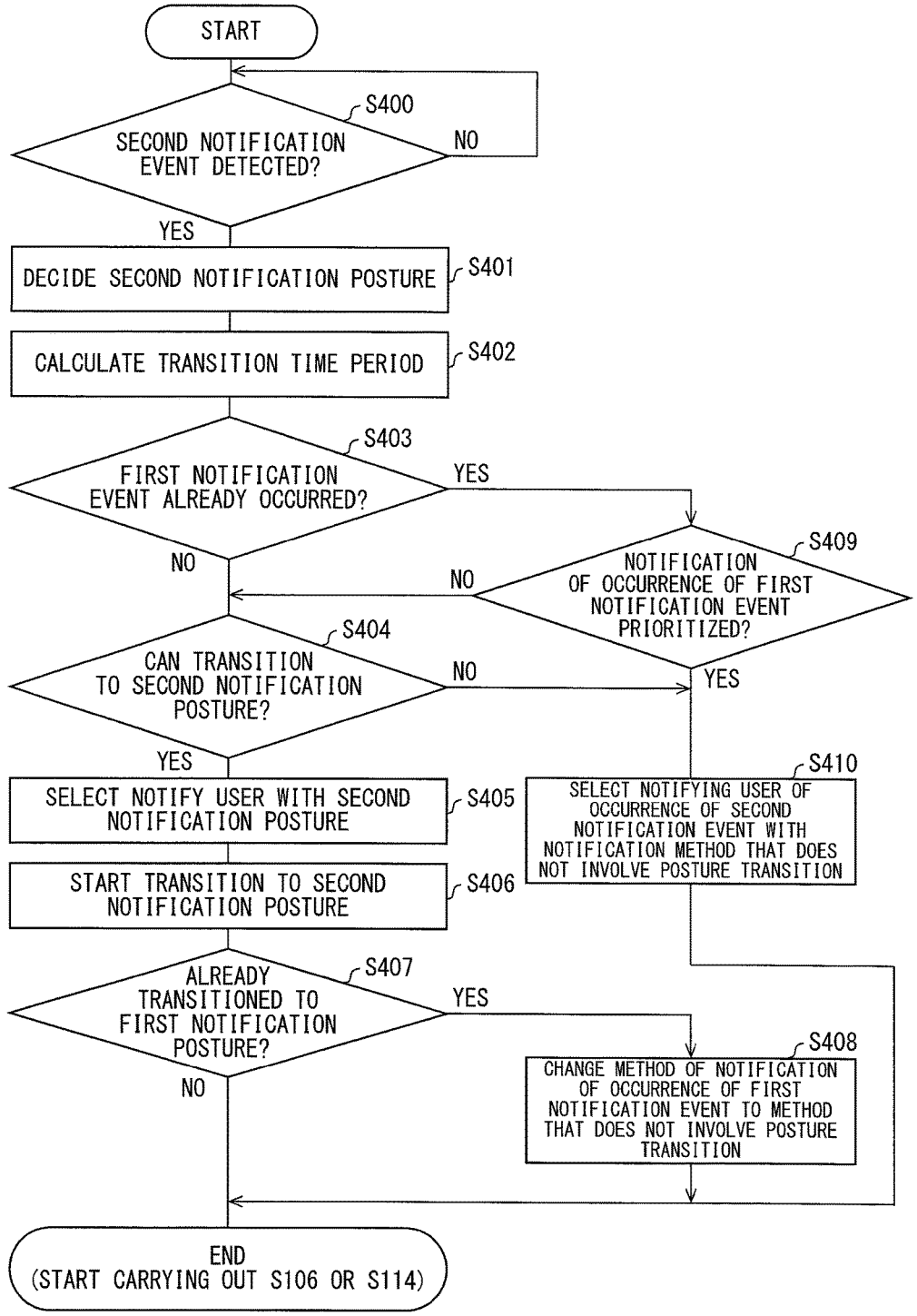

FIG. 9 is a flowchart illustrating how a notification control device in accordance with Embodiment 2 of the present invention controls notification of occurrence of a notification event.

FIG. 10 is an example notification posture table stored in a storage section of a robot in accordance with Embodiment 3 of the present invention.

FIG. 11 is a flowchart illustrating how a notification control device in accordance with Embodiment 3 of the present invention controls notification of occurrence of a notification event.

DESCRIPTION OF EMBODIMENTS

Embodiment 1

The following description will discuss embodiments of the present invention in detail with reference to FIGS. 1 through 8. The descriptions of Embodiment 1 and its subsequent embodiments each assume a notification control device being included in a bipedal humanoid robot having a mobile phone function. The notification control device may alternatively be included in any of various robots such as a robot that resembles a combat robot in an animated cartoon.

(Outline of Robot)

First, the description below outlines a robot 100 with reference to FIG. 2. (a) of FIG. 2 is a schematic elevational view of a robot 100 in accordance with Embodiment 1. (b) of FIG. 2 is a schematic rear view of the robot 100. (c) of FIG. 2 is a schematic side view of the robot 100.

The robot 100, as illustrated in (a) of FIG. 2, includes a head part 100*a*, a body part 100*b*, arm parts 100*c*, leg parts 100*d* (each including an upper leg part 100*o* and a lower leg part 100*p*), and foot parts 100*e*. The robot 100 also includes (i) a neck part 100*g* via which the head part 100*a* is connected movably to the body part 100*b*, (ii) shoulder joint parts 100*h* via which the respective arm parts 100*c* are connected movably to the body part 100*b*, and (iii) leg joint parts 100*i* via which the respective upper leg parts 100*o* are connected movably to the body part 100*b*. The robot 100 further includes (i) knee joint parts 100*q* via which the respective lower leg parts 100*p* are connected movably to the respective upper leg parts 100*o* and (ii) foot joint parts 100*j* via which the respective foot parts 100*e* are connected movably to the respective leg parts 100*d*. The neck part 100*g* and all the joint parts each contain a servomotor 23*a* (described later). Driving the servomotors 23*a* allows movement of the head part 100*a*, the arm parts 100*c*, the upper leg parts 100*o*, the lower leg parts 100*p*, and the foot parts 100*e*. The head part 100*a* includes (i) a mouth part 100*l* containing a loudspeaker section 21 (described later) and (ii) eye parts 100*n* each containing a camera section 20 (described later). The foot parts 100*e* each include a sole part 100*f* containing a microphone section 25 (described later). The body part 100*b*, as illustrated in (b) and (c) of FIG. 2, includes a back part 100*k* provided with a display section 22 (described later).

(Detailed Configuration of Robot)

Figure 1:
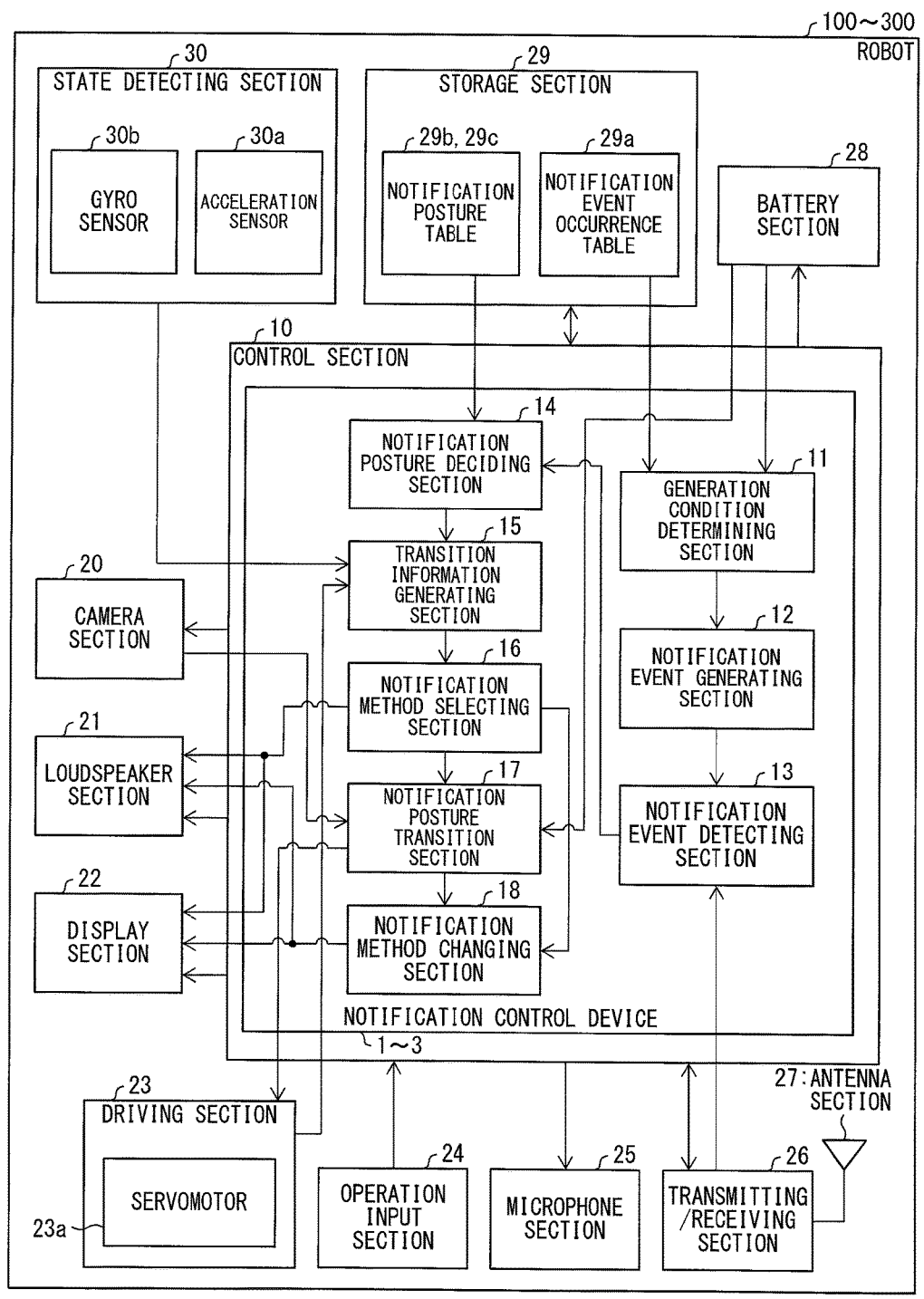
FIG. 1 is a block diagram schematically illustrating a configuration of a robot in accordance with Embodiment 1 of the present invention.

The following description will discuss a detailed configuration of the robot 100 with reference to FIGS. 1, 3, and 4. FIG. 1 is a block diagram illustrating a detailed configuration of the robot 100. The robot 100, as illustrated in FIG. 1, includes a control section 10, camera sections 20, a loudspeaker section 21, a display section 22, a driving section 23, an operation input section 24, microphone sections 25, a transmitting/receiving section 26, an antenna section 27, a battery section 28, a storage section 29, and state detecting sections 30.

The control section 10 centrally controls the robot 100. The control section 10 includes a notification control device 1. The notification control device 1 centrally controls different processes for controlling notification of occurrence of a notification event (described later). The notification control device 1 will be described later in detail.

The camera sections 20 are each an image capturing section that captures an image of an object and that transmits data on the captured image to a notification posture selecting section 14 (described later). The loudspeaker section 21 is a reproducing section that has the function of reproducing information including audio data and that includes a loudspeaker for outputting sound audible to a person(s) other than the user. The display section 22 displays various images such as images displayed in response to carrying out of various functions (application software) of the robot 100. The operation input section 24 receives an input of a user operation. The microphone sections 25 are each a sound collector for picking up sound during, for example, a telephone call. The transmitting/receiving section 26 transmits and receives various data such as audio data through the antenna section 27. The battery section 28 supplies electric power to the individual sections of the robot 100. The driving section 23 drives movable parts of the robot 100 such as the head part 100*a*. The driving section 23 includes servomotors 23*a* in a one-to-one correspondence with the neck part 100*g* and all the joint parts.

The state detecting sections 30 each detect the current movement and state of the robot 100 such as whether the robot 100 is walking or running and whether the robot 100 is having a forward-leaning posture or lying on its back. The state detecting sections 30 also transmit information indicative of the result of the detection to a transition information generating section 15 (described later). The state detecting sections 30 each include an acceleration sensor 30*a* and a gyro sensor 30*b*. The acceleration sensor 30*a* detects acceleration of a movable part of the robot 100, whereas the gyro sensor 30*b* detects angular velocity of the movable part. The state detecting sections 30 each use these two kinds of sensors to detect the current movement and state of the robot 100. The state detecting sections 30 may each include only at least one of the acceleration sensor 30*a* and the gyro sensor 30*b*. The state detecting sections 30 are provided for all the movable parts of the robot 100 (not shown).

The following description will discuss a detailed configuration of the storage section 29. The storage section 29 stores, for example, a notification event occurrence table 29*a*, a notification posture table 29*b*, and various control programs that the control section 10 executes. The storage section 29 includes a nonvolatile storage device such as a hard disk and a flash memory. The notification posture table 29*c* will be described later.

FIG. 3 is an example notification posture table 29*b* stored in the storage section 29. The notification posture table 29*b* is a data table that shows correspondence between notification events, notification posture information, and notification postures. A notification event refers to an occasion (such as an incoming telephone call) of which the robot 100 is configured to notify the user and for which the user needs to take an action in response to the notification by the robot. Example notification events include not only those events which are brought about by factors external to the robot 100 such as an incoming telephone call and incoming email, but also those events (selected notification events) which are brought about by internal factors of the robot 100 such as an alarm. A notification posture is a posture of the robot 100 which posture is suited for allowing the user to recognize occurrence of a notification event. Notification posture information refers to data on respective rotation positions of the servomotors 23*a* which rotation positions correspond to a notification posture.

Specifically, according to the notification posture table 29*b*, an incoming telephone call (notification event) is associated with a notification posture A1 (No. 1 in FIG. 3). The robot 100, when in the notification posture A1, has the leg parts 100*d* inclined toward an abdomen part 100*m* so that (i) the microphone sections 25 (which are included in the respective sole parts 100*f*) are close to the mouth of the user's and that (ii) the loudspeaker section 21 (which is included in the mouth part 100*l*) is close to an ear of the user's. The notification posture A1 allows the user to easily hold the robot 100 for a telephone conversation and to intuitively think of an incoming telephone call. Further, according to the notification posture table 29*b*, an incoming telephone call and the notification posture A1 are associated with data on rotation positions of the first servomotor $\alpha$=a1 through the n-th servomotors $\delta$=n1 (notification posture information) which rotation positions correspond to the notification posture A1. The data on the rotation positions $\alpha$ through $\delta$ may include all values within a range such as a11<$\alpha$<a12 through n11<$\delta$<n12 (No. 2 in FIG. 3).

The association between the three elements applies similarly to a case where the notification event is an alarm, turning on of TV, or a low battery. As in No. 3 and No. 4 in FIG. 3, an alarm is associated with a notification posture A2, in which the robot 100 has one of the arm parts 100c raised. The notification posture A2 thus allows the user to intuitively understand that an urgent action by the user is needed. Further, as in No. 5 and No. 6 in FIG. 3, turning on of TV is associated with a notification posture A4, in which the robot 100 has the body part 100b inclined so that the display section 22 can be easily viewed by the user. The notification posture A4 thus allows the user to intuitively understand that the TV has been turned on. Further, as in No. 7 and No. 8 in FIG. 3, a low battery is associated with a notification posture A5, in which the robot 100 has the body part 100b and the leg parts 100d forming an angle of approximately 90 degrees to sit and which is suited for charging of the robot 100. The notification posture A5 thus allows the user to intuitively understand that the battery is running short. A notification posture may alternatively refer to a state in which a particular movable part of the robot 100 is in motion. For example, as in No. 3 and No. 4 in FIG. 3, an alarm may be associated with a notification posture A3, in which one of the arm parts 100c is in motion as if the robot 100 is waving a hand.

Next, FIG. 4 is an example notification event occurrence table 29a stored in the storage section 29. A selected notification event is a notification event selected by the user, and is brought about by an internal factor of the robot 100. A selected notification event occurrence condition is a condition that needs to be met for the corresponding selected notification event to occur. A selected notification event occurrence condition can be set by the user at will. Specifically, in a case where the user has selected a "first alarm (wakeup alarm)" as a selected notification event and selected "7:00 every day" as the corresponding selected notification event occurrence condition, these items of data are recorded in the notification event occurrence table 29a in association with each other. This allows the first alarm to go off at 7:00 every day (No. 1 in FIG. 4). This description applies similarly to the other selected notification events for No. 2 through No. 4 in FIG. 4.

The following description will discuss a detailed configuration of the notification control device 1. The notification control device 1 includes a generation condition determining section 11, a notification event generating section 12, a notification event detecting section 13, a notification posture selecting section 14, a transition information generating section 15, a notification method selecting section 16, a notification posture transition section 17, and a notification method changing section 18.

The generation condition determining section 11 determines whether a selected notification event occurrence condition has been met. The notification event generating section 12, in a case where it has received from the generation condition determining section 11 a determination result indicating that a selected notification event occurrence condition has been met, generates the corresponding selected notification event. The notification event detecting section 13 detects occurrence of a notification event (which may be a selected notification event).

The notification posture selecting section 14, in a case where it has received from the notification event detecting section 13 a detection result indicating that the notification event detecting section 13 has detected occurrence of a notification event (which may be a selected notification event), refers to the notification posture table 29b to select the notification posture associated with the notification event.

The transition information generating section 15 generates transition information on the basis of first posture information and second posture information. In Embodiment 1 and its subsequent embodiments, the transition information generating section 15 calculates a transition time period as transition information. Transition information is information on a posture transition process, through which the posture of the robot 100 at the time of the notification posture selecting section 14 selecting a notification posture transitions to that notification posture. A transition time period is a kind of transition information, and refers to a time period necessary for the posture of the robot 100 at the time of the notification posture selecting section 14 selecting a notification posture to transition to that notification posture. First notification information is information on the posture of the robot 100 at the time of the notification posture selecting section 14 selecting a notification posture. First notification information includes (i) information that is transmitted from the state detecting sections 30 and that is on acceleration and angular velocity of each movable part of the robot 100 and (ii) data on the respective rotation positions of the servomotors 23a. Second posture information is information on a notification posture associated with the notification event that has occurred. Second posture information includes data that is received from the notification posture selecting section 14 and that is on respective rotation positions of the servomotors 23a which rotation positions correspond to the notification posture. The transition information generating section 15 is not necessarily configured to calculate a transition time period as transition information. The transition information generating section 15 may, for example, alternatively calculate as transition information transition amounts indicative of a difference in rotation position of each servomotor 23a on the basis of first posture information and second posture information. The transition information generating section 15 may further alternatively generate as transition information a value that is based on a transition amount and that is calculated while a parameter of the rotation direction of each servomotor 23a is factored in.

The notification method selecting section 16 selects, on the basis of a calculation result (that is, data on a transition time period) received from the transition information generating section 15, a method for notification of the notification event that has occurred. Specifically, the notification method selecting section 16 first compares the transition time period data with an allowable time period, which is a time period allowed for the robot 100 to transition to a notification posture associated with the notification event that has occurred. The notification method selecting section 16 selects on the basis of the comparison result whether to notify the user of the occurrence of the notification event (i) with use of the notification posture or (ii) by a notification method that does not involve posture transition by the robot 100. If the transition time period data is not longer than the allowable time period corresponding to the notification event that has occurred, the notification method selecting section 16 selects notifying the user of the occurrence of the notification event with use of the notification posture associated with the notification event. If the transition time period data is longer than the allowable time period, the notification method selecting section 16 selects notifying the user of the occurrence of the notification event by a notification method that does not involve posture transition by the robot 100.

Data on the allowable time period is stored in the storage section 29. Specifically, the storage section 29 stores an allowable time period data table (not shown) that associates different time periods in advance with different kinds of notification events. In a case where the notification event is, for example, an incoming telephone call, an alarm, or turning on of TV, the user needs to be notified immediately of the incoming telephone call or the set time point having been reached. In particular, an incoming telephone call often ends in only several seconds. The allowable time period is thus short for such notification events (3 seconds to 5 seconds). In a case where the notification event is a low battery, that low-battery state typically continues for a certain time period, since a robot 100 is not usually set to have a threshold that causes the battery to run out only several seconds after the battery reaches a low-battery state (that is, a state where the remaining charge is smaller than a particular threshold). The allowable time period is thus long for such a notification event (5 seconds to 10 seconds). The allowable time period may be a single predetermined time period for all kinds of notification events, or may be set by the user at will.

In Embodiment 1, the notification method selecting section 16 selects, on the basis of whether the allowable time period has passed, notifying the user either (i) with use of a notification posture or (ii) by a notification method that does not involve posture transition by the robot 100. The notification method selecting section 16 is, however, not necessarily configured to select a notification method in such a manner; for example, the notification method selecting section 16 may combine (i) the use of a notification posture with (ii) a notification method that does not involve posture transition by the robot 100 and switch those two notification methods at the end of the notification event. In a case where the notification event that has occurred is, for example, an incoming telephone call or an alarm, the robot 100 may (i) output sound to notify the user of the incoming telephone call or the set time point having been reached and (ii) use a notification posture to notify the user of the missed call or the set time point having already been passed.

Next, the notification method selecting section 16, in a case where it has selected notifying the user with use of a notification posture, transmits information indicative of the selection result to the notification posture transition section 17. The notification method selecting section 16, in a case where it has selected notifying the user by a notification method that does not involve posture transition by the robot 100, causes that member(s) of the robot 100 to operate which is necessary to notify the user by the above method. In Embodiment 1, examples of a notification method that does not involve posture transition by the robot 100 include (i) a method of displaying an image indicative of occurrence of a notification event on a display screen of the display section 22, (ii) a method of outputting from the loudspeaker section 21 different sounds corresponding to different kinds of notification events that have occurred (or alternatively a single particular sound regardless of the kind of notification event), and (iii) a method of vibrating the robot 100. The robot 100 may, however, be configured to notify the user by a method other than the above or combine two or more of the above methods for notification.

The notification posture transition section 17, in a case where it has received a selection result to the effect that the notification method selecting section 16 has selected notifying the user with use of a notification posture, controls driving of each servomotor 23*a* so that the posture of the robot 100 will transition to the notification posture. Further, the notification posture transition section 17, in a case where it has detected occurrence of a transition blocking occasion during the process of transition to a notification posture, stops the transition to the notification posture and in a case where it has detected the finish of the transition blocking occasion, resumes the stopped transition to the notification posture. The notification posture transition section 17 transmits to the notification method changing section 18 information indicative of such stoppage or resumption of posture transition. A transition blocking occasion refers to an occasion that occurs during the process of transition to a notification posture and that blocks the transition to the notification posture. Example transition blocking occasions include (i) the robot 100 coming into contact with an obstruction over the course of transition to a notification posture and (ii) the remaining charge of the battery falling below a threshold. Such occasions are detected by the notification posture transition section 17 on the basis of an image captured by the camera sections 20 or directly. The robot 100 may additionally include a sensor (for example, a contact sensor or proximity sensor) for detecting occurrence or finish of a transition blocking occasion.

The notification method changing section 18, in a case where it has detected stoppage of transition to a notification posture, changes the method for notification of the notification event that has occurred to a method that does not involve posture transition by the robot 100. The notification method changing section 18, in a case where it has detected resumption of the transition to the notification posture, ends the notification being carried out by the notification method that does not involve posture transition by the robot 100. The method that does not involve posture transition by the robot 100 may be any one of a method of screen display, a method of sound output, and a method of vibration, or may be selected by the user from among the plurality of notification methods. The notification method changing section 18 may alternatively change the notification method to a notification method that combines two or more of the above methods. The notification method changing section 18 may alternatively be configured to automatically select a notification method suitable for the current state of the robot 100; for example, the notification method changing section 18 may be configured to select (i) a vibration method if the robot 100 is in the silent mode or (ii) a method that involves consumption of relatively small power (for example, sound output) if the robot 100 has a low battery.

(Method of Calculating Transition Time Period)

With reference to FIG. 5, the following description will discuss how the transition information generating section 15 calculates a transition time period. FIG. 5 is a diagram schematically illustrating an example operation of the robot 100 which operation is simulated by the transition information generating section 15. For convenience, the description below will deal only with the respective operations of an upper leg part 100*o*, a lower leg part 100*p*, and a foot part 100*e* as illustrated in FIG. 5.

First, the transition information generating section 15 records, on the basis of first posture information, respective rotation positions (corresponding to (1) in FIG. 5) of the respective servomotors 23*a* for the leg joint part 100*i*, the knee joint part 100*q*, and the foot joint part 100*j* at the time of the notification posture selecting section 14 selecting a notification posture (hereinafter referred to as "current time point"). Further, the transition information generating section 15 records, on the basis of second posture information, respective rotation positions (corresponding to (5) in FIG. 5) of the above servomotors 23*a* which rotation positions correspond to the notification posture, which is associated with the notification event that has occurred. Next, the transition information generating section 15 simulates respective operations of the upper leg part 100$o$, the lower leg part 100$p$, and the foot part 100$e$ which operations are necessary for the upper leg part 100$o$, the lower leg part 100$p$, and the foot part 100$e$ to each transition from the state at the current time point to the state corresponding to the notification posture (that is, transition from the state in (1) to the state in (5) in FIG. 5). Then, the transition information generating section 15 calculates respective operation paths for the upper leg part 100$o$, the lower leg part 100$p$, and the foot part 100$e$. FIG. 5 shows that the transition information generating section 15 has calculated respective operation paths for the upper leg part 100$o$, the lower leg part 100$p$, and the foot part 100$e$ as (1)→(2)→(3)→(4)→(5).

Next, the transition information generating section 15 calculates respective rotation positions of the above servomotors 23$a$ in each of the state in (2) through the state (4) in FIG. 5. The transition information generating section 15 then divides (i) the difference between the rotation position of each servomotor 23$a$ in the state in (1) and the rotation position of the servomotor 23$a$ in the state in (2) by (ii) the rotation speed of the servomotor 23$a$ to calculate respective transition time periods necessary for the upper leg part 100$o$, the lower leg part 100$p$, and the foot part 100$e$ to each transition from the state in (1) to the state in (2). The transition information generating section 15 selects the longest one among the calculated transition time periods for use as a transition time period necessary to transition from the state in (1) to the state in (2). The transition information generating section 15 uses a calculation method similar to the above to select a transition time period necessary for each of the transitions from the state in (2) to the state in (3), from the state in (3) to the state in (4), and from the state in (4) to the state in (5). Next, the transition information generating section 15 sums the calculated transition time periods to calculate a transition time period necessary to transition from the state in (1) to the state in (5) in FIG. 5, that is, a transition time period necessary for the upper leg part 100$o$, the lower leg part 100$p$, and the foot part 100$e$ to each transition to a state corresponding to the notification posture. The transition information generating section 15 uses a similar method for any other movable part of the robot 100 to calculate a transition time period necessary for such other movable part to transition to a state corresponding to the notification posture. The transition information generating section 15 eventually selects the longest one among all the calculated transition time periods as a transition time period necessary to transition to the notification posture.

The above calculation method is a mere example. The transition information generating section 15 may use a calculation method other than the above calculation method. For example, the transition information generating section 15 may simply be configured to calculate a transition time period for each movable part by dividing (i) the difference between that rotation position of each servomotor 23$a$ which corresponds to the posture of the robot 100 at the current time point and that rotation position of the servomotor 23$a$ which corresponds to the notification posture by (ii) the rotation speed of the servomotor 23$a$.

(Controlling Notification of Occurrence of Notification Event with Use of Notification Control Device)

With reference to FIG. 6, the following description will discuss how the notification control device 1 controls notification of occurrence of a notification event in a case where the notification event has been brought about by an external factor. FIG. 6 is a flowchart illustrating the control method.

As illustrated in FIG. 6, the notification event detecting section 13 first, in a case where it has detected occurrence of a notification event (YES in step 100; hereinafter abbreviated to "Y in S100"), transmits information indicative of the detection result to the notification posture selecting section 14. The notification event detecting section 13, in a case where it did not detect occurrence of a notification event (NO in S100; hereinafter "NO" is abbreviated to "N"), continues its operation to determine whether a notification event has occurred.

Next, the notification posture selecting section 14, in the case where the notification event detecting section 13 has determined that S100 has resulted in Y, refers to the notification posture table 29$b$ to select the notification posture associated with the notification event that has occurred, and transmits the selection result to the transition information generating section 15 as second posture information (S101). Next, the transition information generating section 15 simulates operation paths for the robot 100 on the basis of (i) the second posture information received from the notification posture selecting section 14 and (ii) a detection result (first posture information) received from the state detecting section 30, and thus calculates a transition time period. The transition information generating section 15 transmits information indicative of the calculation result to the notification method selecting section 16 (S102). Next, the notification method selecting section 16, with reference to the allowable time period data table (not shown), compares (i) the calculation result received from the transition information generating section 15 with (ii) the allowable time period associated with the notification event that has occurred, and thus determines whether the robot 100 will be able to transition to the notification posture (S103). The notification method selecting section 16, in a case where it has determined that S103 has resulted in Y, selects notifying the user with use of the notification posture, and transmits information indicative of the selection result to the notification posture transition section 17 (S104). Next, the notification posture transition section 17, in a case where it has received the selection result, causes the robot 100 to start transitioning to the notification posture (S105).

Next, the notification posture transition section 17 determines whether a transition blocking occasion has occurred (S106). The notification posture transition section 17, in a case where it did not detect occurrence of a transition blocking occasion (N in S106), causes the robot 100 to continue the transition to the notification posture (S112). After the robot 100 has completed the transition to the notification posture, the robot 100 notifies the user of the occurrence of the notification event with use of the notification posture (S113). The notification posture transition section 17, in a case where it has detected occurrence of a transition blocking occasion (Y in S106), causes the robot 100 to stop the transition to the notification posture (S107). The notification method changing section 18, when it has detected the stoppage, carries out a process for changing the notification method to a method that does not involve posture transition by the robot 100 (S108). The notification posture transition section 17, in a case where it has detected the finish of the transition blocking occasion (Y in S109), causes the robot 100 to resume the transition to the notification posture (S110). The notification method changing section 18, when it has detected the resumption, ends the notification of the occurrence of the notification event by the notification method that does not involve posture transition by the robot 100 (S111). The robot 100 then carries out S113. The notification posture transition section 17, in a case where it did not detect the finish of the transition blocking occasion (N in S109), continues to determine whether the transition blocking occasion has finished.

The notification method selecting section 16, in a case where it has determined that S103 has resulted in N, determines whether the robot 100 is in the silent mode (S114). The notification method selecting section 16, in a case where it has determined that the robot 100 is in the silent mode (Y in S114), selects notifying the user of the occurrence of the notification event with use of screen display (S115), and causes the display section 22 to display on the display screen an image indicative of the occurrence of the notification event (S116). The notification method selecting section 16, in a case where it has determined that S114 has resulted in N, determines whether the loudspeaker section 21 is outputting sound (S117). The notification method selecting section 16, in a case where it has determined that the loudspeaker section 21 is not outputting sound (N in S117), selects notifying the user of the occurrence of the notification event with use of sound output (S118), and causes the loudspeaker section 21 to output sound (S119). In a case where the notification method selecting section 16 has determined that S117 has resulted in Y, the robot 100 then carries out the steps S115 and later.

With reference to FIG. 7, the following description will discuss how the notification control device 1 controls notification of occurrence of a selected notification event. FIG. 7 is a flowchart illustrating the control method. The description below omits dealing with steps subsequent to the end of S203 in FIG. 7, as those subsequent steps are similar to S102 and its subsequent steps in FIG. 6.

As illustrated in FIG. 7, the generation condition determining section 11 first refers to the notification event occurrence table 29a to determine whether a selected notification event occurrence condition has been met (S200). The generation condition determining section 11, in a case where it has determined that S200 has resulted in Y, transmits to the notification event generating section 12 information indicative of a determination result to the effect that the condition has been met. The generation condition determining section 11, in a case where it has determined that S200 has resulted in N, continues to determine whether the condition has been met. Then, the notification event generating section 12, when it has received the determination result from the generation condition determining section 11, generates the selected notification event associated with the selected notification event occurrence condition, which has been determined as being met (S201). Next, the notification event detecting section 13, in a case where it has detected occurrence of the selected notification event (Y in S202), transmits information indicative of the detection result to the notification posture selecting section 14. The notification event detecting section 13, in a case where it did not detect occurrence of the selected notification event (N in S202), continues to determine whether the notification event has occurred. Next, the notification posture selecting section 14, in a case where the notification event detecting section 13 has determined that S202 has resulted in Y, refers to the notification posture table 29b to select a notification posture associated with the selected notification event that has occurred (S203).

In the case where the robot 100 notifies the user of occurrence of a notification event by a notification method that does not involve posture transition by the robot 100, the notification method selecting section 16 may alternatively first determine whether the loudspeaker section 21 is outputting sound and then determine whether the robot 100 is in the silent mode. Further, the robot 100 may alternatively have an additional option of notifying the user with use of vibration as illustrated in FIG. 8. Specifically, the notification method selecting section 16, in a case where it has determined that S103 has resulted in N, determines whether the battery section 28 has a remaining charge not smaller than a threshold (S300). The notification method selecting section 16, in a case where it has determined that the remaining charge is not smaller than the threshold (Y in S300), the robot 100 then carries out steps similar to S115 and S116 (S301 and S302). The notification method selecting section 16, in a case where it has determined that the remaining charge is smaller than the threshold (N in S300), carries out a step similar to S114 (S303). Then, the notification method selecting section 16, in a case where it has determined that S303 has resulted in Y, selects notifying the user of the occurrence of the notification event with use of vibration (S304), and vibrates the robot 100 (S305). The notification method selecting section 16, in a case where it has determined that S303 has resulted in N, carries out steps similar to S117 through S119 (S306 through S308). The notification method selecting section 16 may alternatively be configured to make determinations about the remaining charge, vibration, and sound output in an order different from the order illustrated in FIG. 8.

(Effects)

As described above, Embodiment 1 is configured such that even in a case where a notification method using a notification posture is not suitable in relation to the notification event that has occurred (for example, the notification event undesirably ends before the robot 100 transitions to the notification posture associated with the notification event that has occurred), the robot 100 notifies the user by a notification method that does not involve posture transition by the robot 100. This reliably allows the user to recognize the occurrence of the notification event. Further, even in a case where a transition blocking occasion has occurred, Embodiment 1 reliably allows the user to recognize the occurrence of the notification event.

Embodiment 2

The following description will discuss another embodiment of the present invention with reference to FIG. 9. For convenience of description, any member of Embodiment 2 that is identical in function to a corresponding member described for Embodiment 1 is assigned a common reference numeral, and a description thereof is omitted here.

Embodiment 2 includes a notification control device 2, which differs from the notification control device 1 of Embodiment 1 in that in a case where a first notification event has occurred and a second notification event has occurred subsequently, the notification method selecting section 16 of Embodiment 2 compares (i) a transition time period for a first notification posture associated with the first notification event with (ii) a transition time period for a second notification posture associated with the second notification event and selects which notification event has priority for notification of the occurrence. The notification control device 2 of Embodiment 2 also differs from the notification control device 1 of Embodiment 1 in that the notification method selecting section 16 of Embodiment 2, in a case where it has selected a second notification event as having priority, determines whether a robot 200 will be able to transition to the second notification posture. The first notification event is a notification event that has occurred first, whereas the second notification event is a notification event that has occurred after the occurrence of the first notification event. The first notification posture is a notification posture associated with the first notification event, whereas the second notification posture is a notification posture associated with the second notification event. The notification control device 2 of Embodiment 2 further differs from the notification control device 1 of Embodiment 1 in that the notification method changing section 18 of Embodiment 2, in a case where the posture of the robot 200 transitions to a second notification posture, changes the method of notification of occurrence of the first notification event to a method that does not involve posture transition by the robot 200.

(Controlling Notification of Occurrence of Plurality of Notification Events with Use of Notification Control Device)

With reference to FIG. 9, the following description will discuss how the notification control device 2 controls notification of occurrence of a plurality of notification events. FIG. 9 is a flowchart illustrating the control method. The description below omits dealing with steps subsequent to the end of S407, S408, or S410 in FIG. 9, as those subsequent steps are similar to S106 or S114 and its subsequent steps in FIG. 6.

As illustrated in FIG. 9, the notification event detecting section 13, in a case where it has detected occurrence of a second notification event (Y in S400), transmits information indicative of the detection result to the notification posture selecting section 14. The notification event detecting section 13, in a case where it did not detect occurrence of a second notification event (N in S400), continues to determine whether a second notification event has occurred. Then, the notification posture selecting section 14, in the case where S400 has resulted in Y, refers to the notification posture table 29b to select a second notification posture, and transmits the selection result (second posture information) to the transition information generating section 15 (S401). Next, the transition information generating section 15 calculates a transition time period for the second notification posture (hereinafter referred to as "second transition time period") on the basis of first posture information and the second posture information, and transmits information indicative of the calculation result to the notification method selecting section 16 (S402).

Next, the notification method selecting section 16, before the notification posture selecting section 14 selects a second notification posture, determines whether it has already received from the notification event detecting section 13 a result of detection of occurrence of a first notification event (S403). The notification method selecting section 16, in a case where it has determined that S403 has resulted in N, compares (i) the calculation result received from the transition information generating section 15 with (ii) the allowable time period associated with the second notification event, and thus determines whether the robot 200 will be able to transition to the second notification posture (S404). The notification method selecting section 16, in a case where it has determined that S404 has resulted in Y, selects notifying the user with use of the second notification posture, and transmits information indicative of the selection result to the notification posture transition section 17 (S405). The notification method selecting section 16, in a case where it has determined that S404 has resulted in N, selects notifying the user of the occurrence of the second notification event by a notification method that does not involve posture transition by the robot 200 (S410).

Next, the notification method selecting section 16, in a case where it has determined that S403 has resulted in Y, compares (i) a transition time period for the first notification posture (hereinafter referred to as "first transition time period") with (ii) the second transition time period to determine whether the first transition time period is shorter than the second transition time period. Stated differently, the notification method selecting section 16 decides whether to prioritize notification of occurrence of the first notification event (S409). In a case where, for example, the transition information generating section 15 has already calculated the first transition time period, but the notification method selecting section 16 has not yet recorded data on the first transition time period, the notification method selecting section 16 receives that data from the transition information generating section 15 for the comparison of the two transition time periods. In a case where the transition information generating section 15 has not yet calculated the first transition time period, the notification method selecting section 16 commands the transition information generating section 15 to calculate the first transition time period and receives information indicative of the calculation result from the transition information generating section 15. In a case where the first transition time period and the second transition time period are equal to each other in length, the notification control device 2 may carry out any of various processes. For example, the notification control device 2 may be set in advance to prioritize notification of occurrence of one of the notification events, or alternatively the user may set the notification control device 2 as desired. Further, the notification control device 2 may set priority for each notification event and notify the user of a notification event having higher priority.

The notification method selecting section 16, in a case where it has determined that the first transition time period is shorter, that is, in a case where it has decided to prioritize notification of occurrence of the first notification event (Y in S409), carries out S410. After S410 ends, the robot 200 carries out steps similar to the steps S114 and later. The notification method selecting section 16, in a case where it has determined that the first transition time period is longer, that is, in a case where it has decided to prioritize notification of occurrence of the second notification event (N in S409), carries out S404 and S405.

Next, the notification posture transition section 17, when it has received from the notification method selecting section 16 the selection result indicative of notifying the user with use of the second notification posture, causes the robot 200 to start transitioning to the second notification posture (S406). Next, the notification method changing section 18 determines whether the posture of the robot 200 has already transitioned to the first notification posture (S407). In a case where the notification method changing section 18 has determined that S407 has resulted in N, the robot 200 carries out steps similar to the steps S106 and later. The notification method changing section 18, in a case where it has determined that S407 has resulted in Y, changes the method of notification of occurrence of the first notification event to a method that does not involve posture transition by the robot 200 (S408). After S408 ends, the robot 200 carries out steps similar to the steps S114 and later.

The notification method selecting section 16 may decide to prioritize either of the first notification event and the second notification event for notification on the basis of comparison of such transition information other than transition time periods as a transition amount or a value based on a transition amount with a parameter of the rotation direction of each servomotor 23a factored in.

(Effects)

As described above, Embodiment 2 is configured to allow the user to recognize occurrence of a notification event for which notification using a notification posture is more suitable. Further, Embodiment 2 is configured such that the posture of the robot 200 transitioning to the second notification posture can prevent the user from forgetting about the occurrence of the first notification event, thereby reliably allowing the user to recognize the occurrence of the first notification event.

Embodiment 3

The following description will discuss another embodiment of the present invention with reference to FIGS. 10 and 11. For convenience of description, any member of Embodiment 3 that is identical in function to a corresponding member described for Embodiment 1 or 2 is assigned a common reference numeral, and a description thereof is omitted here.

Embodiment 3 includes a notification control device 3, which differs from the notification control device 1 of Embodiment 1 and the notification control device 2 of Embodiment 2 in that in a case where a particular notification event is associated with a plurality of notification postures, the notification method selecting section 16 of Embodiment 3 determines whether the posture of a robot 300 can transition to any of the plurality of notification postures. The robot 300 of Embodiment 3 also differs from the robot 100 of Embodiment 1 and the robot 200 of Embodiment 2 in that a notification posture table 29c is stored in the storage section 29.

(Method for Determining Whether Robot Will be Able to Transition to Notification Posture)

With reference to FIG. 10, the following description will discuss how the notification method selecting section 16, in a case where a particular notification event is associated with a plurality of notification postures, determines whether the robot 300 will be able to transition to a notification posture. FIG. 10 is an example notification posture table 29c stored in the storage section 29.

The notification posture table 29c is a data table that shows correspondence between notification events, notification posture information, and notification postures and that associates a single notification event with a plurality of items of notification posture information and a plurality of notification postures. For example, the notification posture table 29c, as shown in FIG. 10, associates an alarm (notification event) with (i) a notification posture A2 (with the right arm part 100c raised) and (ii) notification posture information corresponding to the notification posture A2 (where data on the respective rotation positions of the first through n-th servomotors is set so that $\alpha=a2$ through $\delta=n2$ or $a21<\alpha<a22$ through $n21<\delta<n22$) (Pattern 1). The notification posture table 29c associates the alarm also with (i) a notification posture A2' (with the left arm part 100c raised) and (ii) notification posture information corresponding to the notification posture A2' (where data on the respective rotation positions of the first through n-th servomotors is set so that $\alpha=a2'$ through $\delta=n2'$ or $a21'<\alpha<a22'$ through $n21'<\delta<n22'$) (Pattern 2).

Specifically, in a case where the alarm has started, the notification method selecting section 16 first selects the notification posture A2 of Pattern 1 as a target posture for the determination of whether the robot 300 will be able to transition to a notification posture. The notification method selecting section 16 then compares a transition time period for the notification posture A2 with the allowable time period associated with the notification posture A2 to determine whether the robot 300 will be able to transition to the notification posture A2. Next, the notification method selecting section 16, in a case where it has determined that the transition time period is longer than the allowable time period and that the robot 300 will not be able to transition to the notification posture A2, selects the notification posture A2' of Pattern 2 as the target posture and carries out a similar determination. Next, the notification method selecting section 16, in a case where it has determined that the robot 300 will not be able to transition to either of the notification postures A2 and A2', determines whether any other notification posture is selectable as the target posture. As indicated in the example in FIG. 10, the notification method selecting section 16 has already selected each notification posture as the target posture for the determination. The notification method selecting section 16 thus eventually determines that the robot 300 will not be able to transition to any notification posture associated with the alarm.

The notification method selecting section 16 may select a notification posture from among a plurality of notification postures for the determination in any order. The order may be set in advance during production of the robot 300 or may be set by the user as desired. Further, a particular notification event is not necessarily associated with two patterns as in FIG. 10 (each pattern referring to a combination of notification posture information and a notification posture), and may be associated with more than two patterns.

(Controlling Notification of Occurrence of Notification Event with Use of Notification Control Device)

With reference to FIG. 11, the following description will discuss how the notification control device 3, in a case where a particular notification event is associated with a plurality of notification postures, controls notification of occurrence of such a notification event. FIG. 11 is a flowchart illustrating the control method. The description below omits dealing with S500 through S513 and S515 through S520 in FIG. 11, as those steps are similar to S100 through S113 and S114 through S119 in FIG. 6.

As illustrated in FIG. 11, the notification method selecting section 16, in a case where it has determined that the robot 300 will not be able to transition to a particular notification posture (N in S503), determines whether the notification method selecting section 16 has already determined, for each of a plurality of notification postures associated with the notification event that has occurred, whether the robot 300 will be able to transition to that posture transition (S514). The notification method selecting section 16, in a case where it has already determined for each of the plurality of notification postures whether the robot 300 will be able to transition to that posture transition (Y in S514), carries out the steps S515 and later. The notification method selecting section 16, in a case where it has not yet determined for each of the plurality of notification postures whether the robot 300 will be able to transition to that posture transition (N in S514), carries out the steps S501 through S503 again.

(Effects)

As described above, Embodiment 3 is configured to allow for, over a case where a particular notification event is associated with only one notification posture, an increased possibility that the robot 300 is able to notify the user of occurrence of a notification event with use of a notification posture. This more reliably allows the user to visually recognize the occurrence of the notification event.

[Software Implementation Example]

Each control block of the notification control devices 1 through 3 (particularly, the control section 10 and the notification method selecting section 16) may be realized by a logic circuit (hardware) on an integrated circuit (IC chip) or may be realized by software as executed by a CPU (central processing unit). In a case where the each control block is realized by software as executed by a CPU, each of the notification control devices 1 through 3 includes: the CPU that executes instructions of a program (software) that realizes each function; a ROM (read only memory) or a storage device (hereinafter referred to as a "storage medium") which stores the program and various kinds of data so as to be read by a computer (or the CPU); and a RAM (random access memory) that develops the program. The object of the present invention is achieved by the computer (or the CPU) reading the program from the storage medium and executing the program. The storage medium can be a "non-transitory tangible medium", for example, a tape, a disk, a card, a semiconductor memory, or a programmable logic circuit. The program may be transferred to the computer via a given transfer medium which can transfer the program (e.g., a communications network or broadcast waves). The present invention can also be implemented by the program in the form of a data signal embedded in a carrier wave which is embodied by electronic transmission.

[Recap]

A notification control device (1, 2, 3) in accordance with a first aspect of the present invention is a notification control device, including: a notification posture selecting section (14) configured to select a notification posture suited for allowing a user to recognize occurrence of a notification event, the notification event being an occasion of which a robot (100, 200, 300) is configured to notify the user and for which the user needs to take an action in response to the notification by the robot; a transition information generating section (15) configured to generate transition information on a basis of the notification posture, the transition information being information on a posture transition process, through which a posture of the robot at a time of the notification posture selecting section selecting the notification posture transitions to the notification posture; and a notification method selecting section (16) configured to select a notification method on a basis of the transition information, the notification method being a method for the notification of the notification event. With this configuration, in a case where the transition information is a transition time period (that is, a time period necessary for the posture of the robot at the time of the notification posture selecting section selecting the notification posture to transition to the notification posture), the notification method selecting section, in a case where the notification event will end within the transition time period, selects a notification method other than a method using a notification posture. Therefore, even in a case where a notification method using a notification posture is not suitable in relation to the notification event that has occurred, the above configuration reliably allows the user to recognize the occurrence of the notification event.

In a second aspect of the present invention, a notification control device (1, 2, 3) is configured such that in the first aspect of the present invention, the transition information generating section (15) calculates, on a basis of (i) first posture information, which is information on the posture of the robot (100, 200, 300) at the time of the notification posture selecting section selecting the notification posture, and (ii) second posture information, which is information on the notification posture, a transition time period as the transition information, the transition time period being a time period necessary for the posture of the robot at the time of the notification posture selecting section selecting the notification posture to transition to the notification posture. With this configuration, the transition information is a transition time period. This allows the notification method selecting section to, by simply determining whether the notification event that has occurred will end within the transition time period or beyond the end of the transition time period, determine whether the robot will be able to notify the user with use of a notification posture. The above configuration therefore allows the notification method selecting section to determine, on the basis of a clear criterion and thus more accurately, whether the robot will be able to notify the user with use of a notification posture.

In a third aspect of the present invention, a notification control device (1, 2, 3) is configured such that in the first or second aspect of the present invention, in a case where the notification method selecting section (16) has determined on a basis of the transition information, obtained from the transition information generating section (15), that the posture of the robot (100, 200, 300) is incapable of transitioning to the notification posture, the notification method selecting section (16) selects as the notification method a method that does not involve posture transition by the robot. With this configuration, even in a case where the robot will not be able to transition to a notification posture, the robot can notify the user of occurrence of a notification event by a notification method that does not involve posture transition by the robot such as sound output. This reliably allows the user to recognize the occurrence of the notification event.

In a fourth aspect of the present invention, a notification control device (3) is configured such that in any of the first to third aspects of the present invention, the notification event is associated with a plurality of notification postures; and the notification method selecting section (16) determines whether the posture of the robot (300) is capable of transitioning to any of the plurality of notification postures. This configuration allows for, over a case where the notification event is associated with only one notification posture, an increased possibility that the robot is able to notify the user of occurrence of a notification event by a notification method that involves posture transition by the robot. This more reliably allows the user to visually recognize the occurrence of the notification event.

The notification control device (1, 2, 3) in accordance with any one of the first to third aspects of the present invention may be configured such that the notification event includes a first notification event and a second notification event; and in a case where the second notification event occurred after occurrence of the first notification event, the notification method selecting section (16) compares (i) transition information for a first notification posture associated with the first notification event with (ii) transition information for a second notification posture associated with the second notification event to select which of occurrence of the first notification event and occurrence of the second notification event has priority for notification. With this configuration, the notification control device, on the basis of the result of comparison between transition information for the first notification posture and transition information for the second notification posture, allows the user to recognize occurrence of a notification event for which notification using a notification posture is more suitable.

The notification control device (1, 2, 3) in accordance with any one of the first to third aspects of the present invention may be configured such that the notification method selecting section (16), in a case where the second notification event occurred after occurrence of the first notification event and the notification method selecting section (16) has prioritized notification of occurrence of the second notification event, determines whether the posture of the robot is capable of transitioning to the second notification posture. This configuration reliably allows the user to recognize a second notification event, which occurs after a first notification event.

The notification control device (1, 2, 3) in accordance with any one of the first to third aspects of the present invention may further include a notification method changing section (18) configured to change the notification method selected by the notification method selecting section (16) to a different notification method, wherein in a case where the second notification event occurred after occurrence of the first notification event and the notification method selecting section has determined that the posture of the robot (100, 200, 300) is capable of transitioning to the second notification posture, the notification method changing section changes the method for notification of the occurrence of the first notification event to a method that does not involve posture transition by the robot. With this configuration, the posture of the robot transitioning to the second notification posture can prevent the user from forgetting about the occurrence of the first notification event, thereby reliably allowing the user to recognize the occurrence of the first notification event.

The notification control device (1, 2, 3) in accordance with any of the first to fourth aspects of the present invention may further include a notification posture transition section (17) configured to, in a case where the notification method selecting section (16) has selected a notification method that uses a notification posture, cause the posture of the robot (100, 200, 300) to transition to that notification posture, wherein in a case where the notification posture transition section has detected occurrence of a transition blocking occasion, which blocks the transition to the notification posture, during a process of the transition to the notification posture, the notification posture transition section stops the transition to the notification posture; and in a case where the notification posture transition section has stopped the transition to the notification posture, the notification method changing section (18) changes the method for notification of the occurrence of the notification event to a method that does not involve posture transition by the robot. This configuration reliably allows the user to recognize the occurrence of the notification event even in a case where a transition blocking occasion has occurred. The above configuration can also prevent the robot from, for example, suffering from damage that would have been caused if the transition to the notification posture had continued despite occurrence of a transition blocking occasion.

The notification control device (1, 2, 3) in accordance with any of the first to fourth aspects of the present invention may be configured such that in a case where the notification posture transition section (17) has detected finish of the transition blocking occasion with the transition to the notification posture stopped, the notification posture transition section (17) resumes the transition to the notification posture; and in a case where the notification posture transition section has resumed the transition to the notification posture, the notification method changing section (18) ends notifying the occurrence of the notification event by a method that does not involve posture transition by the robot (100, 200, 300). This configuration reliably allows the user to visually recognize occurrence of a notification event in a case where the transition blocking occasion has finished. The above configuration can also prevent the notification control device from notifying the user of occurrence of a notification event by more notification methods than necessary, thereby preventing wasteful electric power consumption.

In a fifth aspect of the present invention, a robot (100, 200, 300) includes a notification control device (1, 2, 3) in accordance with any one of the first to fourth aspects of the present invention. This configuration allows for production of a robot that reliably allows the user to recognize the occurrence of the notification event.

The notification control device (1, 2, 3) according to the foregoing embodiments of the present invention may be in the form of a computer. In this case, the present invention encompasses: a notification control program for the notification control device which program causes a computer to operate as each of the above sections of the notification control device so that the notification control device can be in the form of a computer; and a computer-readable recording medium storing the notification control program.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Further, combining technical means disclosed in different embodiments can provide a new technical feature.

INDUSTRIAL APPLICABILITY

The present invention is generally applicable to techniques for allowing a user to recognize a notification event.

REFERENCE SIGNS LIST 1, 2, 3 Notification control device
14 Notification posture selecting section
15 Transition information generating section
16 Notification method selecting section
100, 200, 300 Robot

The invention claimed is:
1. A notification control device, comprising:
a notification posture selecting circuit configured to select a notification posture suited for allowing a user to recognize occurrence of a notification event, the notification event being an occasion of which a robot is configured to notify the user and for which the user needs to take an action in response to the notification by the robot;
a transition information generating circuit configured to generate transition information on a basis of the notification posture, the transition information being information on a posture transition process, through which a posture of the robot at a time of the notification posture selecting circuit selecting the notification posture transitions to the notification posture; and
a notification method selecting circuit configured to select a notification method on a basis of the transition information, the notification method being a method for the notification of the notification event.
2. The notification control device according to claim 1, wherein the transition information generating circuit calculates, on a basis of (i) first posture information, which is information on the posture of the robot at the time of the notification posture selecting circuit selecting the notification posture, and (ii) second posture information, which is information on the notification posture, a transition time period as the transition information, the transition time period being a time period necessary for the posture of the robot at the time of the notification posture selecting circuit selecting the notification posture to transition to the notification posture.

3. The notification control device according to claim 1, wherein in a case where the notification method selecting circuit has determined on a basis of the transition information, obtained from the transition information generating circuit, that the posture of the robot is incapable of transitioning to the notification posture, the notification method selecting circuit selects as the notification method a method that does not involve posture transition by the robot.

4. The notification control device according to claim 1, wherein:

the notification event is associated with a plurality of notification postures; and the notification method selecting circuit determines whether the posture of the robot is capable of transitioning to any of the plurality of notification postures.

5. A notification control method, comprising the steps of:

selecting a notification posture suited for allowing a user to recognize occurrence of a notification event, the notification event being an occasion of which a robot is configured to notify the user and for which the user needs to take an action in response to the notification by the robot;

generating transition information on a basis of the notification posture, the transition information being information on a posture transition process, through which a posture of the robot at a time of the notification posture selecting section selecting the notification posture transitions to the notification posture; and selecting a notification method on a basis of the transition information, the notification method being a method for the notification of the notification event.

* * * * *